Sept. 7, 1937.  H. J. GRIFFING  2,092,732

CRANKPIN GRINDING MACHINE

Filed Aug. 15, 1936

Inventor
Herbert J. Griffing

By Harold W. Eaton
Attorney

Patented Sept. 7, 1937

2,092,732

UNITED STATES PATENT OFFICE 2,092,732

CRANKPIN GRINDING MACHINE

Herbert J. Griffing, Worcester, Mass., assignor to Norton Company, Worcester, Mass., a corporation of Massachusetts Application August 15, 1936, Serial No. 96,230

4 Claims. (Cl. 51—237)

This invention relates to grinding machines, and more particularly to a work holder or pot chuck capable of use in machine tools, such as a double head grinding machine for crankshaft grinding and the like.

One object of the invention is to provide an improved pot chuck for a crankpin grinding machine. Another object of the invention is to provide a pot chuck which may be readily set up for grinding crankshafts of different throws or having bearing surfaces of different diameters. A further object of the invention is to provide a crankshaft work holder with a readily interchangeable, precisely aligned bearing member. A further object of the invention is to provide a work holder for a crankshaft, in which a readily removable bearing support for the crankshaft is adjustable longitudinally of the work holder and serves as an adjustable end thrust member to locate a crankshaft in an endwise direction for a grinding operation. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

Figure 1:
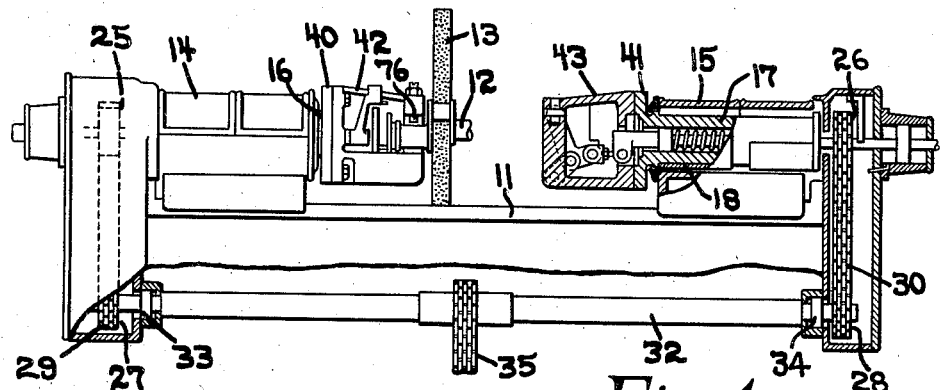
Figure 2:
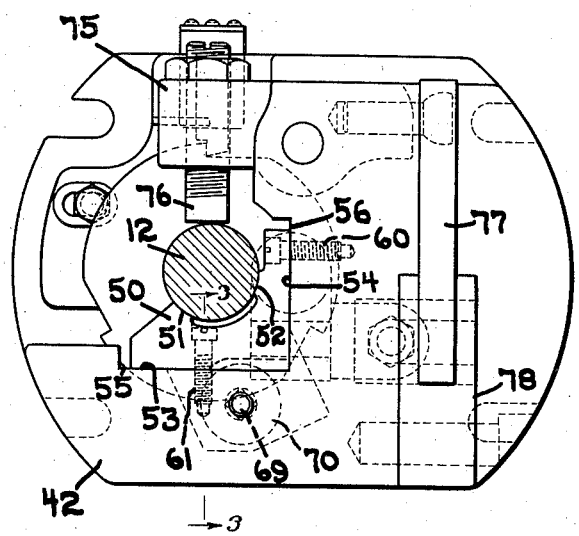
Figure 3:
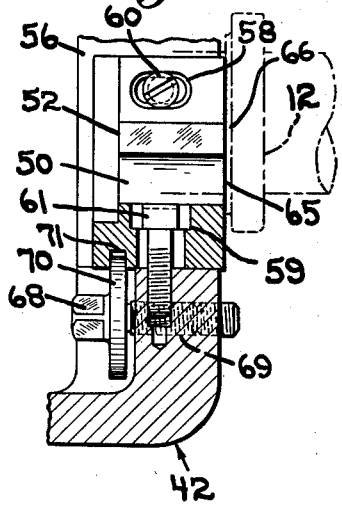

In the accompanying drawing in which is shown one of various possible embodiments of the mechanical features of this invention, Fig. 1 is a fragmentary front elevation of a grinding machine, having parts broken away and shown in section, more clearly to show the operating construction;

Fig. 2 is an end elevation of the left-hand work holder or pot chuck, on an enlarged scale; and Fig. 3 is a fragmentary sectional view, taken approximately on the line 3—3 of Fig. 2.

A grinding machine has been illustrated in the drawing which is of a double head type adapted for crankshaft grinding. A longitudinally movable work table 11 is slidably mounted on suitable ways on the machine base (not shown) and adapted rotatably to support a crankshaft 12 in operative relation with a rotatable grinding wheel 13 which may be mounted on the usual transversely movable wheel slide (not shown). The wheel slide is provided with a suitable feed mechanism (not shown) so that the grinding wheel may be fed transversely toward and from the crankshaft 12 to grind crankpins thereon to a predetermined size. The work table 12 is provided with a pair of work supporting heads which, as illustrated, may be formed integral with the table 11, or if preferred may be bolted rigidly to the table and provided with a suitable adjustment so that the heads may be adjusted transversely or longitudinally of the table to align the axis of one head with the axis of the other head. For further details of this construction, reference may be had to the prior United States patent to Silven and Belden No. 1,837,342 dated December 22, 1931.

A pair of opposed spaced work heads 14 and 15 are provided with a pair of axially aligned rotatable work supporting spindles 16 and 17 journaled in bearings 18 (only one of which has been illustrated) within the heads 14 and 15. The work supporting spindles 16 and 17 are provided at their outer ends with sprockets 25 and 26, respectively, which are in turn connected to sprockets 27 and 28 by link driving chains 29 and 30. The sprockets 27 and 28 are mounted on a drive shaft 32 which is supported in bearings 33 and 34 depending from the work table 11. It is readily apparent from this construction that rotation of the shaft 32 is transmitted through the sprocket and chain to synchronously rotate the work supporting spindles 16 and 17. The drive shaft 32 may be driven by means of a link chain 35 from a driving mechanism (not shown). This mechanism is not considered part of the present invention and, therefore, has not been illustrated. For a disclosure of this mechanism, reference may be had to the above-mentioned prior United States Patent No. 1,837,342.

The inner ends of the work supporting spindles 16 and 17 are formed with integral flanges or face plates 40 and 41, respectively. The face plates 40 and 41 are arranged in turn to support pot chucks 42 and 43, respectively, which are arranged to support and clamp a crankshaft 12 in rigid engagement with the spindles 16 and 17 for a grinding operation while grinding the crankpins thereon. The pot chucks are preferably arranged to support the axis of the crankshaft in an offset relationship with the axis of rotation of the spindles 16 and 17 so that the crankpins to be ground may be positioned in alignment with their axes in alignment with the axis of rotation of the spindles 16 and 17, and clamped in this position for a grinding operation.

In the production of crankshafts, it is frequently necessary to arrange a double head crankpin grinding machine so that the machine may be set up readily for grinding a given crankshaft, the cranks of which have a given throw, and to provide means for readily changing the set-up for grinding other crankshafts having different throws. It is accordingly the primary object of this invention to provide a readily interchangeable means for supporting the opposite ends of a crankshaft in the pot chucks 42 and 43, so that the crankpins to be ground are in alignment with the axis of rotation of the spindles 16 and 17. The pot chucks 42 and 43 are each provided with a crankshaft supporting bearing member 50 which is provided with bearing surfaces 51 and 52 to peripherally engage the end portions of a crankshaft. The bearing support 50 is provided with locating surfaces 53 and 54 which are plane surfaces and arranged at right angles to each other. The surfaces 53 and 54 are arranged to mate with correspondingly shaped plane right angle surfaces 55 and 56, respectively, on the pot chuck 42. The bearing block 50 for supporting a crankshaft 20 is machined accurately so that the axis of a shaft 12 having a predetermined throw will be offset from the axis of rotation of the work spindles by an amount equal to the throw of the crankpins of the shaft to be ground. By providing right angle plane locating surfaces for the block 50, interchangeable blocks for various throws of crankshafts or various bearing diameters readily may be provided and readily interchanged to set up the machine for grinding the desired crankshaft.

The crankshaft supporting bearing block 50 is provided with a pair of elongated slots 58 and 59 through which pass a pair of clamping screws 60 and 61. The clamping screws 60 and 61 are screw threaded into the pot chuck frame 42 and are arranged to securely clamp the bearing block 50 with locating surfaces 53 and 54 in engagement with the mating surfaces 55 and 56 on the pot chuck frame 42.

It is desirable to provide a suitable means for locating the crankshaft being ground in an axial direction so that successive crankshafts are clamped in the same relative position within the pot chuck 42 and 43. The pot chuck 42 which supports the left-hand end of a crankshaft 12 (Fig. 1) may be provided with a locating means to locate the shaft 12 in an endwise direction within the machine. In the preferred construction, as illustrated, the end face 65 of the crankshaft bearing support 50 may be utilized as a locating surface to locate the crankshaft 12 in an endwise direction. When the crankshaft 12 is inserted in the machine within the bearing blocks 50 in opposite pot chucks 42 and 43, it is moved endwise in a direction toward the left until the portion 66 of the crankshaft engages the locating surface 65, and may then be clamped in operating position within the pot chucks 42 and 43.

It is desirable to provide an adjustment for the bearing supporting members 50 in a direction parallel to the axis of the spindle 16 in order to position the locating surface 65 in the desired position. This preferably is accomplished by providing an adjusting screw 68 having a threaded portion 69 which is screw threaded into the pot chuck frame 42. The screw 68 is provided with an enlarged integral flange 70 which engages a groove 71 in the lower surface of the bearing blocks 50. When it is desired to adjust the bearing blocks 50 lengthwise of the machine, the screws 60 and 61 may be loosened and the adjusting screw 68 rotated so as to move the crankshaft bearing supports 50 endwise into the desired location. After the supporting bearings 50 have been located in the desired position, they may then rigidly be clamped in position on the pot chuck by tightening the screws 60 and 61.

After the crankshaft supporting bearing blocks 50 have been adjusted into the desired position, a crankshaft 12 to be ground may be set in position so that it is supported by the bearing surfaces 51 and 52 on bearing blocks 50 in the opposed pot chucks 42 and 43. The clamping jaw 75 having an adjustable work engaging member 76 is then actuated by means of the toggle levers 77 and 78 in a manner the same as that shown in the prior United States Patent No. 1,837,342, to which reference may be had for a more detailed disclosure of the work clamping mechanism.

Each of the pot chucks 42 and 43 is identical in construction, consequently one only has been illustrated and described in detail. The chucks 42 and 43 are each provided with a readily detachable interchangeable work supporting bearing member 50. In case it is desired to grind the crankpins on a crankshaft having a different throw or having a different diameter bearing portion, it is necessary merely to change the members 50 and to insert thereinstead a pair of members 50 which are shaped to locate the crankshaft to grind the pins thereon to the desired throw. The clamping jaw 76 is then adjusted to securely clamp the crankshaft in the pot chucks.

In the operation of the improved pot chucks, a pair of crankshaft bearing supporting members 50 are placed in the opposed pot chucks 42 and 43. The screw 68 on the left-hand pot chuck 42 is then adjusted to position the bearing blocks 50 longitudinally relative to the pot chuck so as to locate the crankshaft to be ground in the desired longitudinal position. The members 50 are then locked rigidly in position on the pot chucks 42 and 43 by tightening the screws 60 and 61, respectively. After a batch of crankshafts of a given throw have been ground and it is desired to change the set-up of the machine for grinding a crankshaft having a different throw, the bearing blocks 50 are removed from the machine by loosening the screws 60 and 61 and a new set of bearing blocks 50 are inserted thereinstead, which have surfaces 51 and 52 formed relative to the locating right angle plane surfaces 53 and 54 to locate the crankshaft to be ground in a predetermined relation with the spindles 16 and 17 to grind the pins to the desired throw.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:—

1. A pot chuck for a crankpin grinding machine having a rotatable spindle, a frame mounted on said spindle, a movable clamping jaw on said frame, a detachable fixed work supporting and locating member opposed to said clamping jaw precisely to locate and support a crankshaft in said chuck, a pair of plane locating surfaces on said member which are arranged at right angles to each other, mating locating surfaces on said frame, and means including clamping screws detachably to secure said member in a fixed position on the frame.

2. A pot chuck for a crankpin grinding machine having a rotatable spindle, a pot chuck frame mounted on said spindle, a movable clamping jaw on said frame, a detachable fixed work supporting and locating bearing member opposed to said clamping jaw precisely to locate and support a crankshaft in said chuck, a partial cylindrical work supporting surface on said member, a pair of plane locating surfaces on said member which are arranged at an angle to each other, mating locating surfaces on said frame, and clamping screws which are arranged rigidly to clamp said mating surfaces together detachably to secure the member in a fixed position on the frame.

3. A pot chuck for a crankpin grinding machine having a rotatable spindle, a pot chuck frame mounted on said spindle, a movable clamping jaw on said frame, a detachable work supporting bearing member opposed to said clamping jaw, plane locating surfaces on said member which are arranged at right angles to each other, mating locating surfaces on said frame, clamping screws detachably to secure said member to the frame, and means to adjust said member in a direction parallel to the axis of said spindle.

4. A pot chuck for a crankpin grinding machine having a rotatable grinding wheel, a rotatable spindle, a pot chuck frame mounted on said spindle, a movable clamping jaw on said frame, a detachable work supporting bearing member opposed to said clamping jaw which is arranged to support a crankshaft for a grinding operation, a pair of plane locating surfaces on said member which are arranged at right angles to each other, mating locating surfaces on said frame, elongated slots through said member, clamping screws which pass through said slots and are screw threaded into said frame detachably to secure said member to the frame, an end thrust surface on said member, and means including an adjusting screw to adjust the position of said member relative to the frame in a direction parallel to the axis of said spindle to position the end thrust surface on said members so as to locate successive crankshafts in a predetermined position for a grinding operation.

HERBERT J. GRIFFING.